(12) United States Patent
Sullivan

(10) Patent No.: US 6,550,260 B1
(45) Date of Patent: Apr. 22, 2003

(54) VIBRATION DETECTION IN A TRANSPORT REFRIGERATION SYSTEM THROUGH CURRENT SENSING

(75) Inventor: Dennis Wayne Sullivan, Elbridge, NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 09/966,827

(22) Filed: Sep. 28, 2001

(51) Int. Cl.$^7$ .............................. F25B 49/00; F25B 1/00
(52) U.S. Cl. ............................................ 62/126; 62/230
(58) Field of Search .................... 62/230, 126, 129, 62/133, 134; 417/63, 18

(56) References Cited

U.S. PATENT DOCUMENTS

| | | | | |
|---|---|---|---|---|
| 4,361,045 A | * | 11/1982 | Iwasaki ........................ | 73/654 |
| 4,448,059 A | * | 5/1984 | Kondo et al. ................... | 73/35 |
| 5,125,241 A | * | 6/1992 | Nakanishi et al. ............. | 62/296 |
| 5,203,178 A | * | 4/1993 | Shyu ............................ | 62/180 |
| 5,222,373 A | * | 6/1993 | Waldschmidt ................ | 62/239 |
| 5,596,879 A | * | 1/1997 | Burkhart et al. ............... | 62/296 |
| 5,746,062 A | * | 5/1998 | Beaverson et al. ......... | 62/228.3 |
| 5,894,736 A | * | 4/1999 | Beaverson et al. ........... | 62/230 |
| 5,950,439 A | * | 9/1999 | Peterson et al. ................ | 62/80 |
| 5,975,854 A | * | 11/1999 | Culp, III et al. ............... | 417/18 |
| 6,302,654 B1 | * | 10/2001 | Millet et al. ................... | 417/63 |
| 2002/0018724 A1 | * | 2/2002 | Millet et al. ................ | 417/228 |

FOREIGN PATENT DOCUMENTS

| | | | | |
|---|---|---|---|---|
| JP | 61272483 A | * | 12/1986 | ..................... 417/9 |
| JP | 63268990 A | * | 11/1988 | ................... 417/12 |
| JP | 01224484 A | * | 9/1989 | ................... 417/12 |
| JP | 03031667 A | * | 2/1991 | ................... 62/129 |

* cited by examiner

*Primary Examiner*—Denise L. Esquivel
*Assistant Examiner*—Marc Norman
(74) *Attorney, Agent, or Firm*—Carlson, Gaskey & Olds P.C.

(57) ABSTRACT

A current sensor positioned on a power line monitors current draw associated with an electrical motor driven shaft based device, such as a scroll compressor. Mechanical vibrations in the scroll compressor force stress on the motor shaft of the scroll compressor, directly influencing current draw. By monitoring current draw, vibrations resulting from problems in the compressor, such as a broken mounting bracket, can be detected. A controller receives the current values and indicates if a current value exceeds a threshold current value or if a plurality of current values exceed a threshold value.

13 Claims, 2 Drawing Sheets

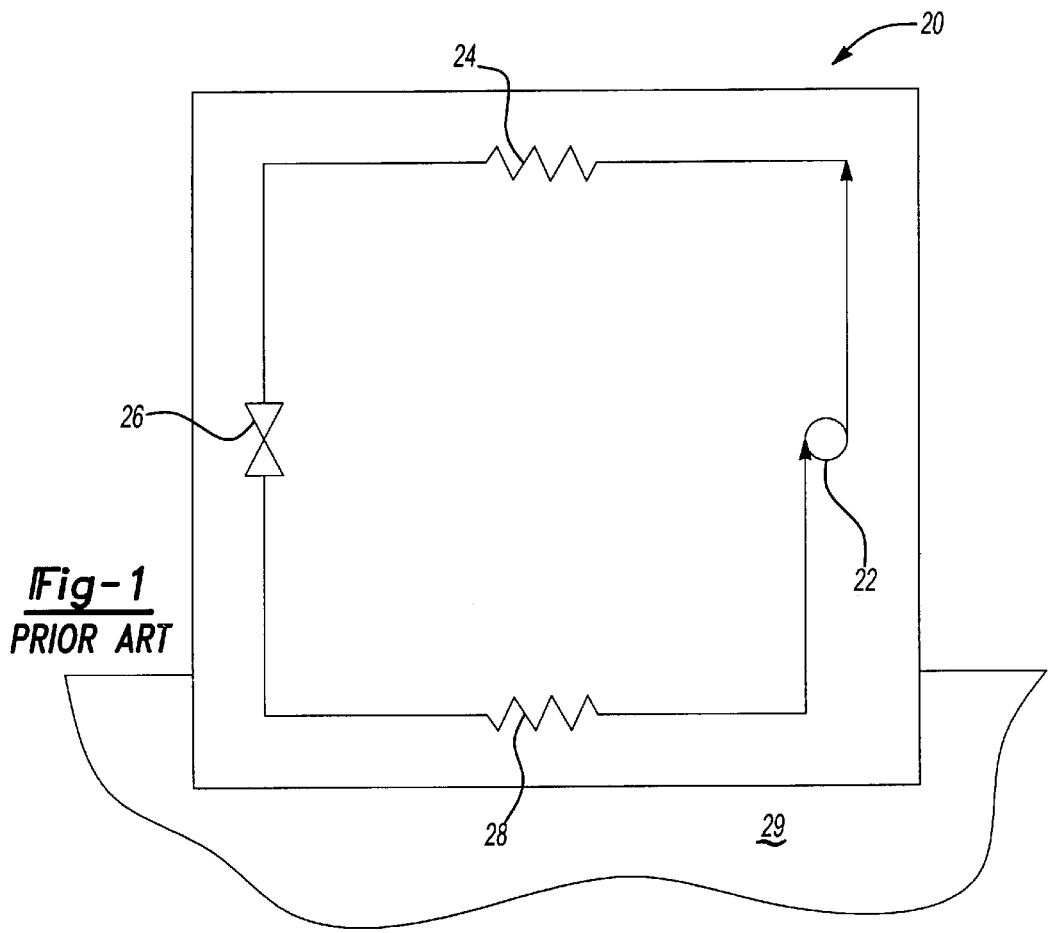
Fig-1
PRIOR ART
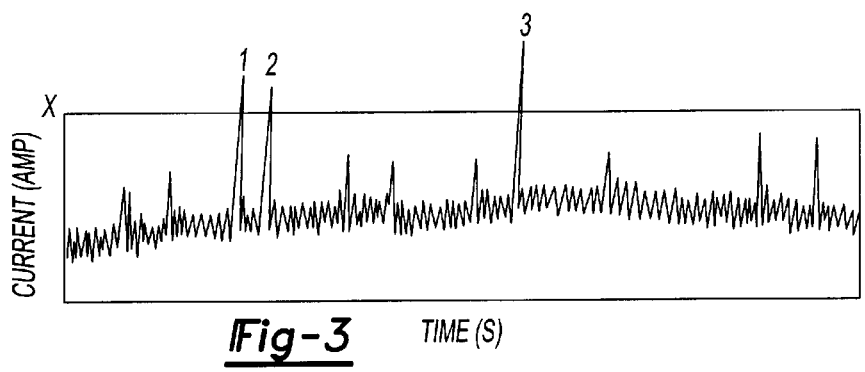
Fig-3  TIME (S)
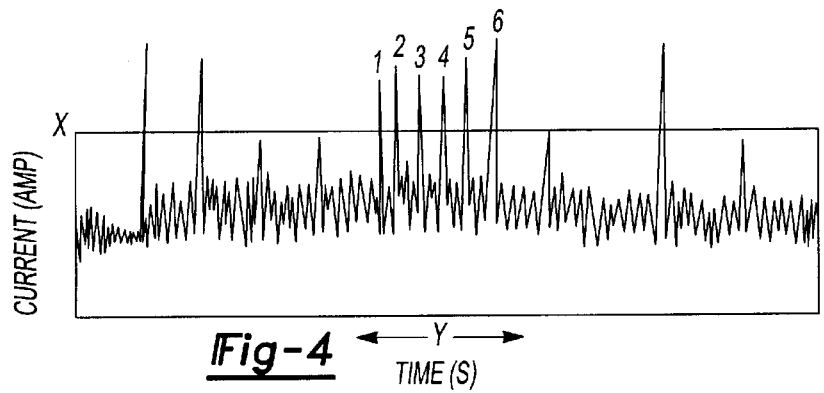
Fig-4  TIME (S)

VIBRATION DETECTION IN A TRANSPORT REFRIGERATION SYSTEM THROUGH CURRENT SENSING

BACKGROUND OF THE INVENTION

The present invention relates generally to a transport refrigeration system employing a current sensor used to detect unacceptably high levels of mechanical vibrations associated with an electrical motor drive shaft based device, such as a scroll compressor.

A current sensor positioned on a power line leading to a system component in a transport refrigeration product monitors current in the component. In prior transport refrigeration products, the current sensor monitors current to determine system operation states and to perform self-diagnostic tests to determine if a system component is working properly. If a component is not working properly or is turned off, the system current is less than what the system current would be if the component is working properly or is turned on. When the current sensor detects this, the current values are displayed on a display/keypad interface to indicate the system operating state to the system user.

Vibration within a compressor can be indicative of a problem with the compressor or with the overall refrigeration system. To date, there has been no simple and effective way of identifying undue levels of vibration. As an example, problems within the compressor, such as a broken mounting bracket, can result in mechanical vibrations increasing to high levels. It would be desirable that a warning signal be sent in the event that such levels are occurring.

Problems such as mentioned above are particularly desirable detected early on in transport refrigeration systems. A transport refrigeration system is typically utilized on a vehicle transporting refrigerated cargo, such as frozen foods and perishable cargo. If this system is associated with a failing compressor, the entire cargo could be lost.

SUMMARY OF THE INVENTION

Applicant has recognized that high vibration in an electrical motor driven shaft based device will result in detectable current peaks. The present invention relates to a transport refrigeration system employing a current sensor used to detect unacceptably high levels of mechanical vibrations associated with an electrical motor driven shaft based device, and in particular a compressor employed as part of a transport refrigeration system.

A power source supplies power to the compressor of a transport refrigeration system. A current sensor positioned on at least one of the power line legs monitors current draw associated with the compressor. Compressor vibrations force stress on the compressor motor shaft, directly influencing the current draw. As vibrations in the compressor increases, the current draw associated with the compressor increases. By monitoring the current draw associated with the compressor, unacceptably high levels of mechanical vibrations resulting from problems in the compressor, such as a broken mounting bracket, can be detected.

The current values monitored by the current sensor are received by a controller. If the current sensor detects a current value exceeding a threshold current value, the controller indicates that the compressor is undergoing excess vibrations. Alternatively, the controller indicates when the current sensor detects a plurality of current peaks exceeding a threshold current value in a time frame. A warning signal or corrective action can then be taken.

Accordingly, the present invention provides a transport refrigeration system employing a current sensor used to detect unacceptably high levels of mechanical vibrations associated with a compressor. Preferably, the system is utilized with a scroll compressor used in a transport refrigeration system.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawing that accompany the detailed description can be briefly described as follows:

FIG. 1 illustrates a schematic diagram of a refrigerant cycle;

FIG. 3 illustrates a graphic illustration of current values which exceed a predetermined current value; and FIG. 4 illustrates a graphic illustration of a predetermined number of current peaks exceeding a predetermined current value in a predetermined time frame.

DETAILED DESCRIPTION OF THE PREFERRED EMBODIMENT

Figure 2:
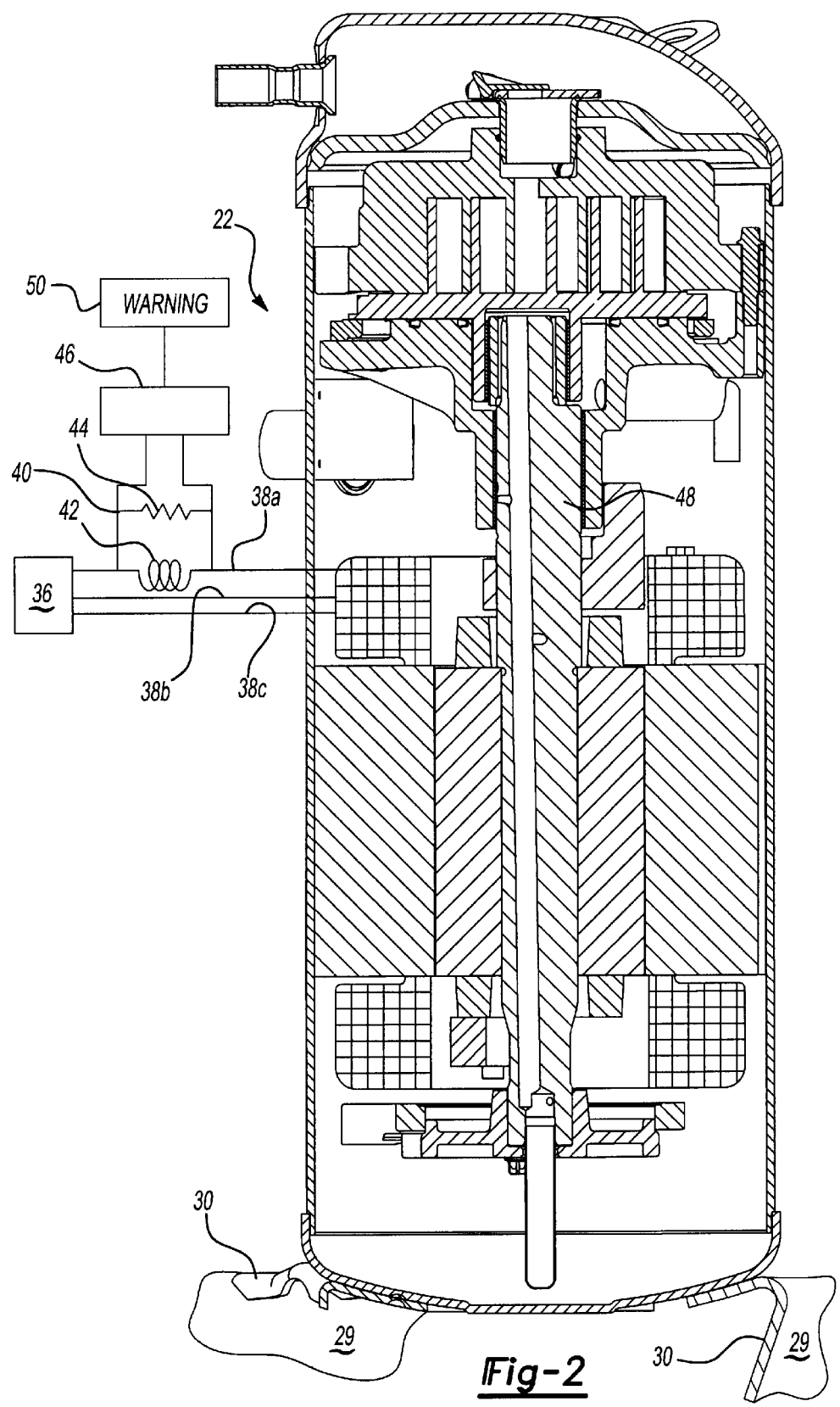
FIG. 2 illustrates a schematic diagram of a scroll compressor utilized in a transport refrigeration system including a current sensor to detect current draw associated with the scroll compressor.

FIG. 1 schematically illustrates a refrigeration cycle 20. The refrigeration cycle 20 consists of a compressor 22, a heat rejecting heat exchanger (a condenser) 24, an expansion device 26, and a heat accepting heat exchanger (an evaporator) 28.

Refrigerant is circulated though the closed circuit refrigeration cycle. The refrigerant exits the compressor 22 at high pressure and enthalpy. As the refrigerant flows through the condenser 24 at high pressure, it loses heat and enthalpy, exiting the condenser 24 with low enthalpy and high pressure. As the refrigerant passes through the expansion device 26, the pressure of the refrigerant drops. After expansion, the refrigerant passes through the evaporator 28 and exits at a high enthalpy and low pressure. After the refrigerant passes through the compressor 22, it is again at high pressure and enthalpy, completing the refrigeration cycle 20. As shown schematically, the refrigerant cycle 20 is preferably included as part of a transport refrigeration system, such as commonly utilized to cool a transported refrigerated container 29. As is known, such systems are typically incorporated into containers carried by trucks, ships, rail, or other sources, to transport perishable and frozen goods, such as frozen food.

As shown schematically in FIG. 2, the compressor 22 is secured by a mounting bracket 30 to the transport container 29. Although a compressor 22 is disclosed, it is to be understood that any electrical motor driven shaft based device can be employed. The compressor 22 is preferably a scroll compressor driven by a power source 36. Three power line legs 38A, 38B, and 38C supply "three phase power" from the power source 36 to the scroll compressor 22. Although a three phase power supply is illustrated and described, it is to be understood that this invention would extend to single phase power.

A current sensor 40 monitors the current in power line leg 38A. However, it is to be understood that two or all of the power leg lines 38A, 38B and 38C can be monitored by current sensors 40. Preferably, the current sensor 40 includes a resistor 44 and an internal coil 42. However, other types of current sensors 40 can be used.

There is a direct relationship between the current draw associated with the scroll compressor 22 and the mechanical vibrations within the compressor 22. Compressor 22 problems, either external or internal, apply vibration on the motor shaft 48 of the compressor 22, increasing current draw associated with compressor 22. For example, a broken mounting bracket 30 results in vibrations on the shaft 48 of the compressor 22, increasing the current drawn on the compressor 22. By monitoring the current draw with a current sensor 40, problems such as a broken mounting bracket 30 can be detected.

The current values monitored by the current sensor 40 are received by a controller 46. As shown in FIG. 3, if the current sensor 40 detects a current value greater than a threshold current value of X amps, the controller 46 indicates this to a user, such as by signal 50. As illustrated, the controller 46 indicates excess vibrations at points 1, 2 and 3. The current threshold value X is dependent on the system requirements. Alternatively, as illustrated in FIG. 4, if the current sensor 40 detects a plurality of current values above threshold current value X amps in time frame Y seconds, the controller 46 indicates this to a user. In the illustrated embodiment, 6 readings higher than X amps in Y seconds is an indication of excess vibrations. The predetermined amount and intensity of the current values depend on the system requirements.

The transport refrigeration system of the present invention including a current sensor 40 for detecting vibrations can be used with any transport refrigeration system, including ships, trains, trailers and trucks. Even though it is disclosed that the current sensor 40 detects current, and thus vibrations, in the compressor 22, it is to be understood that the current sensor 40 can detect vibrations in other components of the transport refrigeration system. The current sensor 40 can be utilized in any electrical motor driven shaft based device. Further, while it is current which identifies the vibrations, it should be understood that other characteristics within the operation of the compressor could be indicative of vibration and could be sensed and utilized to identify undue vibration in accordance with the teaching of this invention.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A refrigeration system comprising:
   a compressor, a condenser, an evaporator and an expansion device for circulating a refrigerant; and
   at least one sensor used to sense at least one system value representative of a level of vibration in said compressor of said refrigeration system, and said system value is a current value being delivered to a motor of said compressor, and said compressor is mounted to a container unit by a mounting bracket, said at least one sensor sensing an increase in said at least one current value and said level of vibration when said mounting bracket is broken.

2. The refrigeration system as recited in claim 1 wherein said compressor is a scroll compressor.

3. The refrigeration system as recited in claim 1 further including a controller which receives said at least one system value.

4. The refrigeration system as recited in claim 1 wherein said refrigeration system is incorporated into a transport refrigeration unit.

5. The refrigeration system as recited in claim 3 wherein said controller indicates when a plurality of said at least one current value exceeds a threshold current value in a timeframe.

6. The refrigeration system as recited in claim 1 wherein said refrigeration system is incorporated into a transport refrigeration unit.

7. The refrigerated system as recited in claim 6 wherein said at least one sensor includes a resistor and an internal coil.

8. A transport refrigeration system comprising:
   a compressor to compress a refrigerant to a high pressure, said compressor being provided with an electric current to drive a motor of said compressor;
   a heat rejecting heat exchanger for cooling said refrigerant;
   an expansion device for reducing said refrigerant to a low pressure;
   a heat accepting heat exchanger for evaporating said refrigerant;
   a refrigeration container for being cooled by said heat accepting heat exchanger; and
   at least one current sensor to sense at least one current value representative of a level of vibration being delivered to said compressor motor, and compressor is mounted to a container unit by a mounting bracket, said at least one current sensor sensing an increase in said at least one current value and said level of vibration when said mounting bracket is broken.

9. The transport refrigeration system as recited in claim 8 wherein said compressor is a scroll compressor.

10. The transport refrigeration system as recited in claim 8 wherein said at least one current value is current draw associated with said compressor.

11. The transport refrigeration system as recited in claim 8 further including a controller which receives said current value.

12. The transport refrigeration system as recited in claim 11 wherein said controller indicates when said at least one current value exceeds a threshold current value.

13. The transport refrigeration system as recited in claim 11 wherein said controller indicates when a plurality of said at least one current value exceeds a threshold current value in a timeframe.

* * * * *

UNITED STATES PATENT AND TRADEMARK OFFICE
CERTIFICATE OF CORRECTION

PATENT NO. : 6,550,260 B1  Page 1 of 1
DATED : April 22, 2003
INVENTOR(S) : Dennis Wayne Sullivan It is certified that error appears in the above-identified patent and that said Letters Patent is hereby corrected as shown below:

Column 4,
Lines 14-16, "The refrigeration system as recited in claim 1 wherein said refrigeration system is incorporated into a transport refrigeration unit." should be replaced with
-- The refrigeration system as recited in Claim 3 wherein said controller indicates when said at least one current value exceeds a threshold current value. --

Column 4,
Line 24, "6" should be -- 1 --.

Signed and Sealed this

Twelfth Day of August, 2003

JAMES E. ROGAN
*Director of the United States Patent and Trademark Office*